(12) United States Patent
Touhey et al.

(10) Patent No.: US 6,422,960 B1
(45) Date of Patent: Jul. 23, 2002

(54) SELF CONTAINED SPORT BALL INFLATION MECHANISM

(75) Inventors: Daniel P. Touhey, Lee, MA (US); Brian Feeney, Enfield, CT (US); Joseph E. Stahl, Southampton, MA (US); Richard F. Terrazzano, Salem, NH (US); Eric K. Litscher, Hopkinton, MA (US); Andrew C. Harvey, Waltham, MA (US); Malcolm E. Taylor, Pepperell, MA (US); Robert C. Sykes, Burlington, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/594,547

(22) Filed: Jun. 14, 2000

Related U.S. Application Data

(60) Provisional application No. 60/159,311, filed on Oct. 14, 1999.

(51) Int. Cl.[7] .............................................. A63B 37/00
(52) U.S. Cl. ..................................................... 473/593
(58) Field of Search ................................ 473/593, 594, 473/595, 603, 604, 605, 607, 608, 609, 610

(56) References Cited

U.S. PATENT DOCUMENTS

| 602,294 | A | | 4/1898 | Arnold |
| 2,625,770 | A | * | 1/1953 | Steen et al. .................. 473/610 |
| 2,698,028 | A | | 12/1954 | Lee et al. |
| 3,020,673 | A | | 2/1962 | Cooke |
| 3,119,617 | A | * | 1/1964 | Topper ......................... 473/593 |
| 4,842,563 | A | * | 6/1989 | Russell ........................ 473/610 |
| 5,098,095 | A | | 3/1992 | Weiss |
| 5,098,329 | A | * | 3/1992 | Tseng .......................... 473/610 |
| 5,102,365 | A | * | 4/1992 | Wang ........................... 473/610 |
| 5,238,244 | A | | 8/1993 | Cotter et al. |

* cited by examiner

*Primary Examiner*—Steven Wong

(57) ABSTRACT

An inflatable sport ball, such as a basketball, a football, a soccer ball, a volley ball or a playground ball, is provided with self-contained inflation means for inflating or more likely adding pressure to the ball. The inflation means is a vessel inside of the ball containing a high pressure gas which may be bled form the vessel into the interior of the ball surrounding the vessel such as by valve means operable from the outside of the ball.

20 Claims, 3 Drawing Sheets

SELF CONTAINED SPORT BALL INFLATION MECHANISM

This application claims the benefit of U.S. Provisional Application No. 60/159,311, filed Oct. 14, 1999.

BACKGROUND OF THE INVENTION

The present invention relates to sport balls which contain mechanisms for inflating or adding pressure to the balls.

Conventional inflatable sport balls, such as basketballs, footballs, soccer balls, volley balls and playground balls, are inflated through a traditional inflation valve using a separate inflation needle that is inserted into and through a self-sealing inflation valve. A separate pump, such as a traditional bicycle pump, is connected to the inflation needle and the ball is inflated using the pump. The inflation needle is then withdrawn from the inflation valve which self-seals to maintain the pressure. This system works fine until the sport ball needs inflation or a pressure increase and a needle and/or pump are not readily available.

SUMMARY OF THE INVENTION

The present invention provides a sport ball which has a self-contained inflation mechanism. The object is to be able to inflate or add pressure to a sport ball without the need for separate inflation equipment such as a separate inflation needle and pump. Specifically, the invention relates to a sport ball which contains on the inside a source of high pressure gas such as air or carbon dioxide with means to release a quantity of that high pressure gas from the source into the ball to achieve the desired pressure.

DESCRIPTION OF THE PREFERRED EMBODIMENTS

Figure 1:
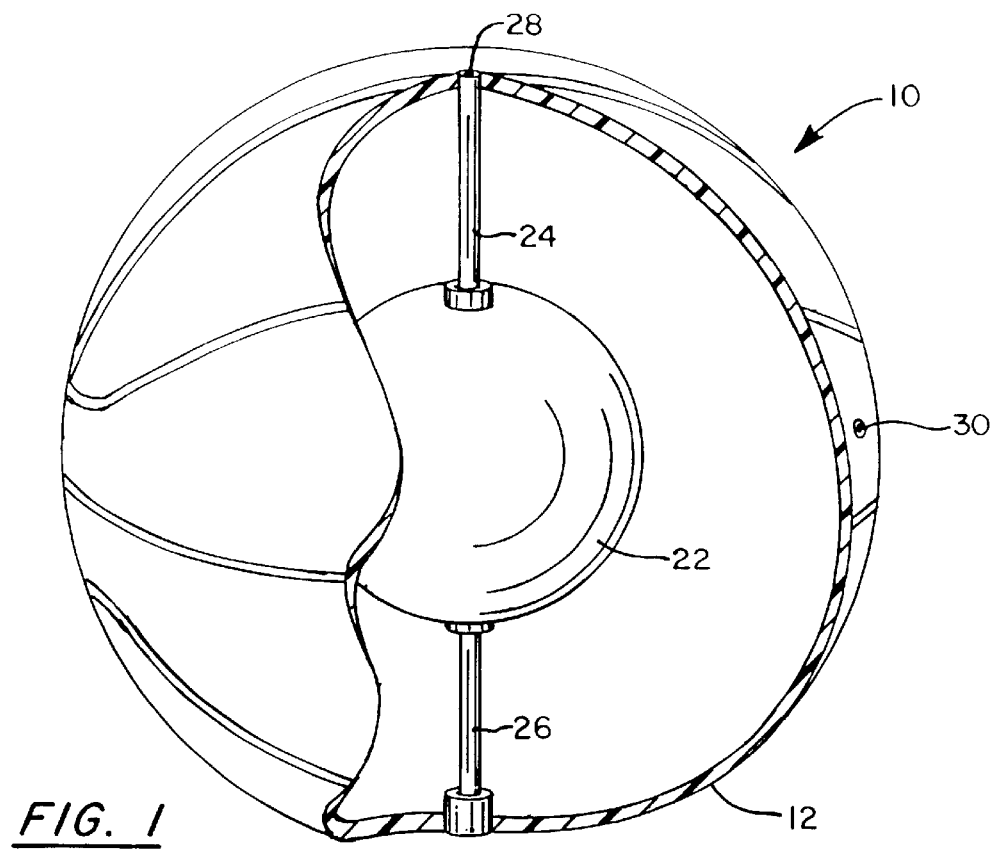
FIG. 1 illustrates a sport ball with a cut away section showing a self-contained high-pressure gas source operable from outside the ball for releasing gas into the ball.
Figure 2:
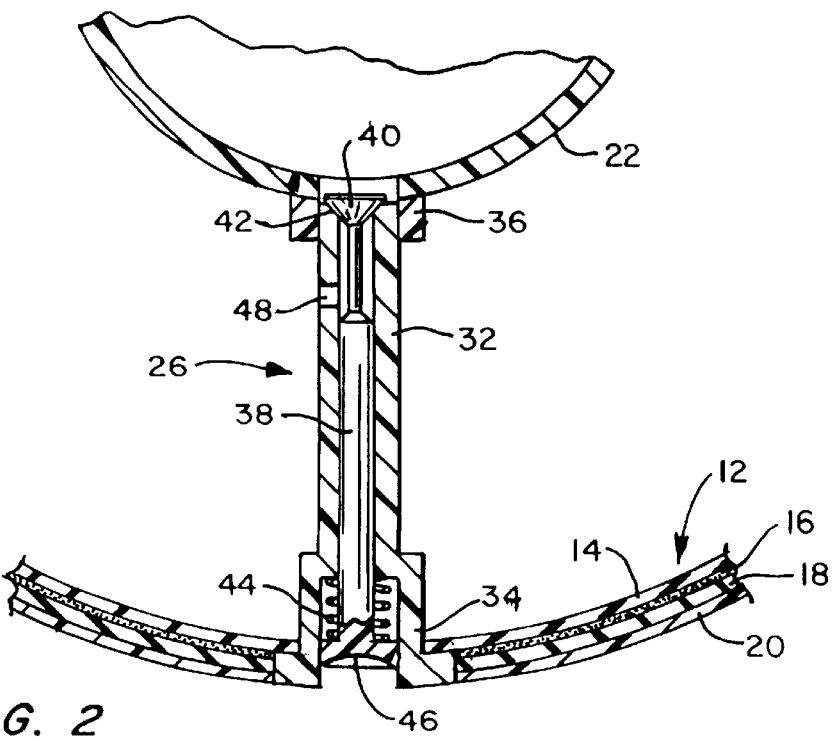
FIG. 2 is a detailed sectional view of the valve mechanism of FIG. 1.

Referring first to FIGS. 1 and 2 of the drawings, a sport ball 10 is illustrated incorporating one embodiment of an inflation device of the invention. The ball which is illustrated is a typical basketball construction comprising a carcass 12 which is shown in FIG. 2 as having a rubber bladder 14 for air retention, a layer 16 composed of layers of nylon or polyester yarn windings wrapped around the bladder and an outer rubber layer 18. For a laminated ball, an additional outer layer 20 of leather or a synthetic comprises panels which are applied by adhesive and set by cold molding. The windings 16 are randomly oriented and two or three layers thick and they form a layer which cannot be extended to any significant degree and which restricts the ball from expanding to any significant extent above its regulation size if it were to be inflated above its normal playing pressure. This layer for footballs, volleyballs and soccer balls is referred to as a lining layer and is usually composed of cotton or polyester cloth that is impregnated with a flexible binder resin such as vinyl or latex rubber.

In accordance with the present invention, the sport ball contains a separate vessel on the inside which contains a gas at a higher pressure than the normal inflation pressure of the ball. For example, the normal inflation pressure of various inflatable sports balls can range from about 5 psig to 15 psig depending on the particular type of ball. The separate high-pressure gas vessel may contain a gas at perhaps as much as 100 psig whereby gas can be released from the high-pressure vessel into the lower pressure internal volume of the ball to increase the ball pressure.

FIG. 1 illustrates one embodiment of such an arrangement comprising the sport ball 10 having the carcass 12. Mounted inside of the ball 10 is a vessel 22 which is the vessel containing the gas at a high pressure. The vessel 22 may be of any desired material which will contain the high gas pressure but it is preferably as lightweight as practical. Some examples of materials for the vessel 22 are polyethylene terephthalate and nylon. The vessel 22 is illustrated as being mounted in the ball 10 by the vessel gas release device 26 although other mounting arrangements can be used.

The vessel filling tube 24 is a hollow tube which is preferably flexible and which is connected into the vessel 22 and is joined to a typical sport ball needle valve 28. A conventional inflation needle is inserted through the needle valve 28 and gas, usually air, is pumped through the tube 24 into the vessel 22. The needle is then withdrawn and the needle valve 28 prevents the escape of pressure from the vessel 22. The ball may also have a separate needle valve 30 for the initial direct inflation of the ball in a conventional manner. The inflation device of the present invention is usually used for adding pressure to an already inflated ball rather than for the initial inflation.

The vessel gas release device 26 is illustrated in some detail in FIG. 2. A tube 32 is attached into the carcass 12 at 34 and is attached into the vessel 22 at 36. Extending through the tube 32 is a valve stem 38 terminating at the valve member 40 which mates with the valve seat 42 at the end of the tube 32. The valve stem 38 is biased by the spring 44 to maintain the valve member 40 sealed to the valve seat 42. When the button 46 on the outside end of the valve stem 38 is pressed in against the spring pressure, the valve is opened and pressure is released from the vessel 22 into the pipe 32 and out through the aperture 48 into the internal volume of the ball thereby increasing the ball pressure.

Figure 3:
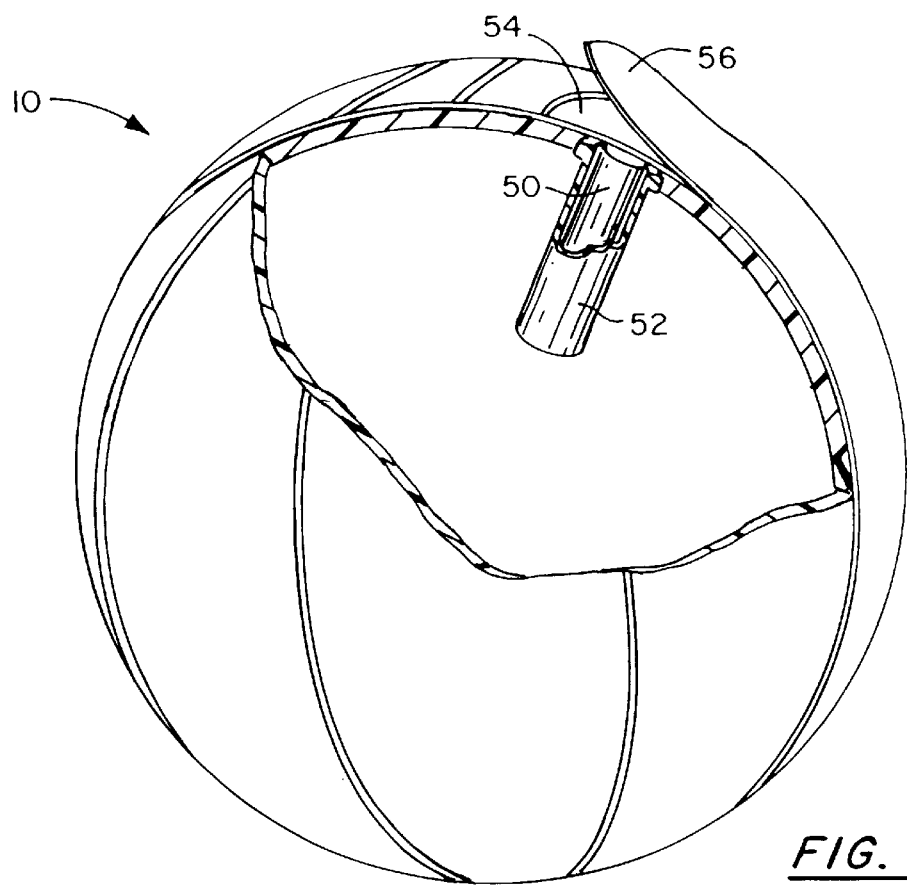
FIG. 3 is a sport ball with a cut-away section showing another embodiment of the invention with a different high pressure gas source.
Figure 4:
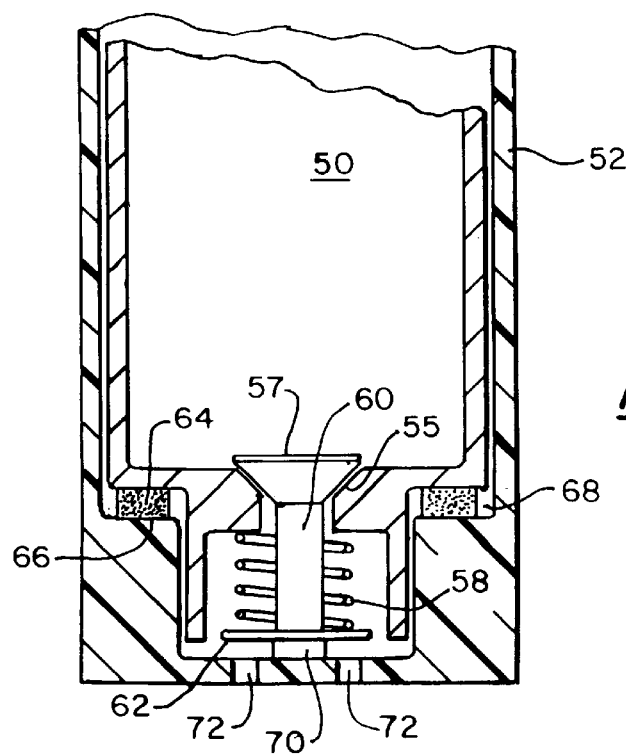
FIG. 4 is a detailed sectional view of the gas source and valve mechanism of the FIG. 3 embodiment.

Another embodiment of the invention is shown in FIGS. 3 and 4 in which the vessel of high-pressure gas is a prepressurized gas vessel such as a carbon dioxide cylinder 50. The gas may be contained at such a high pressure that it exists in a liquid form within the vessel. Similar cartridges are used in paint ball guns and are readily available. The gas vessel 50 is contained in a chamber 52 which is covered with a flexible disk 54 to maintain the bounce of the ball. A flip-up flap 56, which may be held down with velcro, provides access for replacing the vessel 50. FIG. 4 shows the details of the vessel 50 in the chamber 52 including the valving arrangements for releasing gas pressure from the vessel 50 into the inside volume of the ball. At the end of the vessel 50 is a valve seat 55 and a valve 57. The spring 58 surrounding the valve stem 60 and acting on the plate 62 attached to the valve stem 60 forces the valve 57 into the closed position against the valve seat 54. A resilient ring 64 between the vessel 50 and the end portion 66 of the chamber 52 maintains the spacing 68. When the other end of the vessel 50 at the carcass is pressed, the resilient ring 64 compresses and forces the plate 62 against the post 70. This forces the valve 57 to open releasing gas from the vessel 50 through the holes 72 into the interior of the ball.

Figure 5:
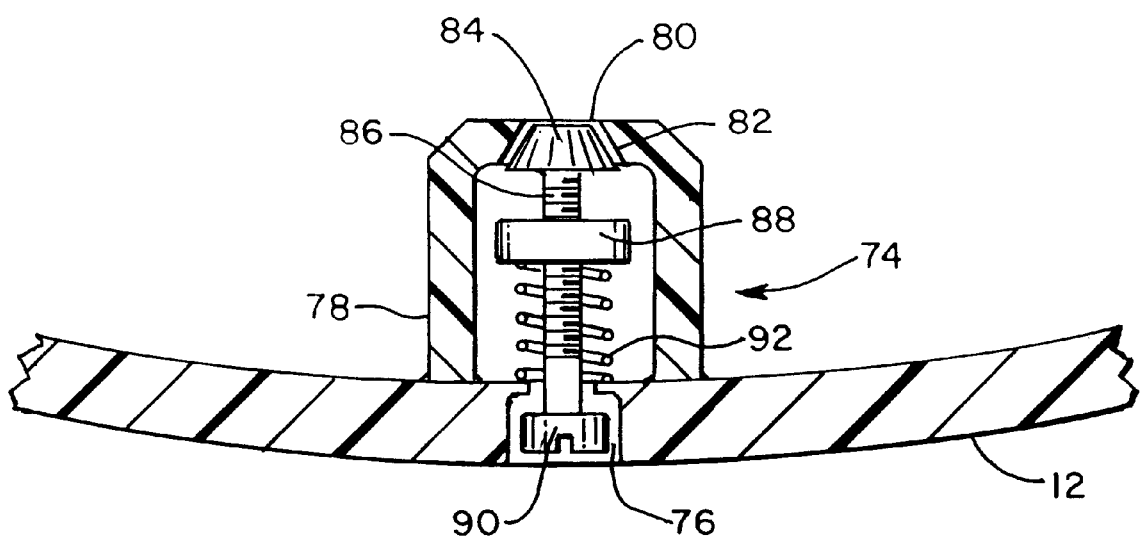
FIG. 5 is a sectional view of an adjustable, self-regulating pressure relief valve.

Since the pressure in a sport ball can be too high through overinflation or a temperature increase, it is advisable to have a way to bleed pressure from the ball when the conventional inflating needle is not available. Such an arrangement is shown in FIG. 5 involving a self-regulating, adjustable pressure relief valve 74. This comprises an aperture 76 through the carcass 12 covered on the inside by the cup-shaped enclosure 78. The enclosure 78 has an opening 80 with a valve seat 82. The valve 84 seals against the valve seat 82 to hold the pressure in the ball. The valve stem 86 is threaded through a disk 88 whereby the disk 88 can be moved axially on the valve stem 86 by turning the head 90 of the valve stem 86. A spring 92 is located around the valve stem 86 between the disk 88 and the carcass. Therefore, turning the head 90 and valve stem 86 moves the disk 88 axially on the valve stem and adjusts the pressure of the spring 92. The pressure of the spring 92 is adjusted such that an over pressure in the ball will force the valve to open and bleed pressure and then close when the desired pressure is reached.

A further embodiment of the invention is a variation of the embodiment depicted in FIG. 1. This comprises a sphere, such as the sphere 22, of high pressure air or other gas supported inside of the ball. In this case, the sphere 22 is formed form a polymeric material which is semi-permeable and which has a known rate of diffusion of the contained air or other gas out through the sphere into the ball. Suitable materials for the sphere can be selected from polymeric materials known to diffuse gases such as polyethylene terephthalate and polyvinyl chloride. For any particular type of ball and ball construction materials, an air loss rate is established. On that basis, a particular size sphere with a corresponding surface area and diffusion rate is selected to match the air loss rate from the ball with the air flow out of the sphere into the ball. In this embodiment, the gas release device 26 is omitted and a support for the sphere is substituted. The vessel filling tube 24 is retained to replenish the air in the sphere which has diffused out into the ball. This will then bring the pressure in the sphere up to the initial pressure to maintain the desired diffusion rate.

What is claimed is:

1. An inflatable sport ball comprising a carcass defining an interior ball volume adapted to contain an inflating gas at a first pressure, a vessel supported inside of said carcass and within said interior ball volume adapted to contain a pressurizing gas at a second pressure greater than said first pressure, said vessel including means for bleeding pressurizing gas from said vessel into said interior ball volume to increase said first pressure, wherein said means for bleeding pressurizing gas from said vessel comprises valve means attached to said vessel manually operable from outside of said carcass.

2. An inflatable sport ball comprising a carcass defining an interior ball volume adapted to contain an inflating gas at a first pressure, a vessel supported inside of said carcass and within said interior ball volume adapted to contain a pressurizing gas at a second pressure greater than said first pressure, said vessel including means for bleeding pressurizing gas from said vessel into said interior ball volume to increase said first pressure, wherein said means for bleeding pressurizing gas from said vessel comprises a polymeric semipermeable vessel material which diffuses gas from said vessel into said interior ball volume.

3. An inflatable sport ball as recited in claim 2 and further including means for introducing gas into said vessel.

4. An inflatable sport ball as recited in claim 1 and further including means for introducing gas into said vessel.

5. An inflatable sport ball as recited in claim 1 and further including means for bleeding pressure from said ball.

6. An inflatable sport ball as recited in claim 5 and further including means for adjusting said means for bleeding pressure from said ball.

7. An inflatable sport ball as recited in claim 1 wherein the vessel contains compressed $CO_2$ gas.

8. An inflatable sport ball as recited in claim 1 wherein said sport ball is a basketball.

9. An inflatable sport ball as recited in claim 1 wherein said sport ball is a volley ball.

10. An inflatable sport ball as recited in claim 1 wherein said sport ball is a football.

11. An inflatable sport ball as recited in claim 1 wherein said sport ball is a soccer ball.

12. An inflatable sport ball as recited in claim 1 wherein said sport ball is a playground ball.

13. An inflatable sport ball comprising a carcass defining an interior ball volume adapted to contain an inflating gas at a first pressure, a vessel supported inside of said carcass and within said interior ball volume adapted to contain a pressurizing gas at a second pressure greater than said first pressure, said vessel including means for bleeding pressurizing gas from said vessel into said interior ball volume to increase said first pressure, wherein said means for bleeding pressurizing gas from said vessel comprises a semipermeable vessel material which diffuses gas from said vessel into said interior ball volume.

14. An inflatable sport ball as recited in claim 13 and further including means for introducing gas into said vessel.

15. An inflatable sport ball as recited in claim 13 and further including means for bleeding pressure from said ball, wherein said means for bleeding pressure from said ball are adjustable.

16. An inflatable sport ball as recited in claim 13 wherein said sport ball comprises a ball selected from the group consisting of basketballs, volleyballs, footballs, soccer balls and playground balls.

17. An inflatable sport ball as recited in claim 13 wherein the vessel contains compressed $CO_2$ gas.

18. The inflatable sport ball as recited in claim 16 wherein said sport ball is a soccer ball.

19. The inflatable sport ball as recited in claim 16 wherein said sport ball is a basketball.

20. An inflatable sport ball as recited in claim 2 wherein said polymeric semipermeable vessel material is polyethylene terephthalate, polyvinyl chloride or combinations thereof.

* * * * *